United States Patent
Levine et al.

(10) Patent No.: US 6,657,706 B2
(45) Date of Patent: Dec. 2, 2003

(54) METHOD AND APPARATUS FOR RESOLVING RELATIVE TIMES-OF-ARRIVAL OF LIGHT PULSES

(75) Inventors: Peter Alan Levine, West Windsor, NJ (US); Taner Dosluoglu, Plainsboro, NJ (US); Nathaniel Joseph McCaffrey, Rosemont, NJ (US); John Robertson Tower, Yardley, PA (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 10/107,966

(22) Filed: Mar. 27, 2002

(65) Prior Publication Data

US 2003/0184728 A1 Oct. 2, 2003

(51) Int. Cl.$^7$ .............................. G01C 3/08; G04F 10/00
(52) U.S. Cl. ....................... 356/5.01; 356/5.08; 368/121
(58) Field of Search ...................... 356/4.01, 5.01–5.08; 368/121

(56) References Cited

U.S. PATENT DOCUMENTS

| | | | |
|---|---|---|---|
| 5,056,914 A | 10/1991 | Kollodge | 356/5 |
| 5,162,861 A | 11/1992 | Tamburino et al. | 356/5 |
| 5,319,611 A | 6/1994 | Korba | 367/98 |
| 5,357,331 A | 10/1994 | Flockencier | 356/5 |
| 5,446,529 A | 8/1995 | Stettner et al. | 356/4.01 |
| 5,641,919 A | 6/1997 | Dahneke | 73/865.5 |
| 5,682,229 A | 10/1997 | Wangler | 356/4.01 |
| 5,835,204 A | 11/1998 | Urbach | 356/5.01 |
| 5,870,180 A | 2/1999 | Wangler | 356/401 |
| 6,133,989 A | 10/2000 | Stettner et al. | 356/4.01 |
| 6,137,566 A | 10/2000 | Leonard et al. | 356/141 |
| 6,323,941 B1 | 11/2001 | Evans et al. | 356/4.01 |
| 6,323,942 B1 | 11/2001 | Bamji | 356/5.01 |

FOREIGN PATENT DOCUMENTS

WO    WO 98/10255    *    3/1998

* cited by examiner

Primary Examiner—Stephen C. Buczinski
(74) Attorney, Agent, or Firm—William J. Burke

(57) ABSTRACT

A method and apparatus for resolving relative times-of-arrival of a plurality of light pulses includes a plurality of drift-field detectors. Each drift-field detector includes a light sensor and a semiconductor drift region. Each light sensor generates an electrical charge from at least one of the plurality of light pulses. Each semiconductor drift region receives the electrical charge from its respective light sensor and, pursuant to an electric field therein, produces a spatial charge distribution. The spatial charge distribution for each of the semiconductor drift regions is stored in an analog storage device associated therewith. The relative positions of the charge distributions in the semiconductor drift regions are used to calculate the relative times-of-arrival of the light pulses.

24 Claims, 6 Drawing Sheets

METHOD AND APPARATUS FOR RESOLVING RELATIVE TIMES-OF-ARRIVAL OF LIGHT PULSES

BACKGROUND OF THE INVENTION

1. Field of the Invention

The present invention generally relates to a method and apparatus for sensing, receiving, and processing light signals and, more particularly, to a method and apparatus for accurately resolving relative times-of-arrival of light pulses.

2. Description of the Related Art

In general, three-dimensional imaging systems employing active sources, such as laser detection and ranging (LADAR) systems, suffer from one primary problem: sensors designed to obtain two-dimensional amplitude images are not adept at rendering an image in three-dimensions. While there have been many attempts at adopting such two-dimensional sensors to three-dimensional imaging, such systems have always been found to be lacking, particularly in range resolution and sensitivity.

For example, one type of known three-dimensional imaging approach uses very high pixel sampling rates in various forms to determine time of flight for the laser pulse to travel from the laser to a target and on to a detector. The time of flight of an illuminating pulse is very difficult to measure since one nanosecond of time resolution is required to achieve one foot of depth resolution. As such, these systems typically employ high-speed counting and high-speed clocking circuits for operation. In cases where a depth resolution of inches is necessary (i.e., sub-nanosecond time differences must be resolved), the required operating speed of these counting and clocking circuits is difficult to achieve. Other known systems measure phase shifts between the illuminating signal and the signal returned from the target. These systems are susceptible to noise and provide inadequate sensitivity when the signal reflected from the target is very weak.

Therefore, there exists a need in the art for a method and apparatus for accurately resolving sub-nanosecond differences between times-of-arrival of light pulses.

SUMMARY OF THE INVENTION

The present invention is a device for resolving relative times-of-arrival of a plurality of light pulses comprising a plurality of drift-field detectors. Each drift-field detector comprises a light sensor and a semiconductor drift region. Each light sensor generates an electrical charge from at least one of the plurality of light pulses. Each semiconductor drift region receives the electrical charge from its respective light sensor and, pursuant to an electric field therein, produces a spatial charge distribution. The spatial charge distribution for each of the semiconductor drift regions is stored in an analog storage device associated therewith. In one embodiment of the invention, the analog storage devices comprise charge-coupled device (CCD) registers. The relative positions of the charge distributions in the semiconductor drift regions can be used to calculate the relative times-of-arrival of the light pulses. The present invention can be used in three-dimensional imaging applications, where the relative times-of-arrival of reflected light pulses are used to calculate the depth of the scene.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention is an apparatus for resolving relative times-of-arrival of light pulses without relying upon high-speed counting and clocking circuitry. As described in detail below, the present invention comprises a plurality of drift-field detectors generally formed in an array. Each drift-field detector comprises a semiconductor drift region coupled to a light sensor. The present invention resolves relative times-of-arrival of light pulses by measuring the distance a photo-generated charge packet moves through an electric field in the drift region for each drift-field detector. The apparatus of the present invention can be used in three-dimensional imaging applications, where a drift-field detector is used at each pixel of a three-dimensional image sensor and the time-of-arrival of a reflected light pulse incident on each pixel in the imaging array is used to produce a three-dimensional image. By eliminating clocking limitations, the present invention can resolve sub-nanosecond time-of-arrival differentials, advantageously providing depth information in an imaged scene to an accuracy of a centimeter or better. Those skilled in the art will appreciate that the present invention is useful in any application that requires resolving relative times-of-arrival of light pulses with high accuracy.

Figure 1:
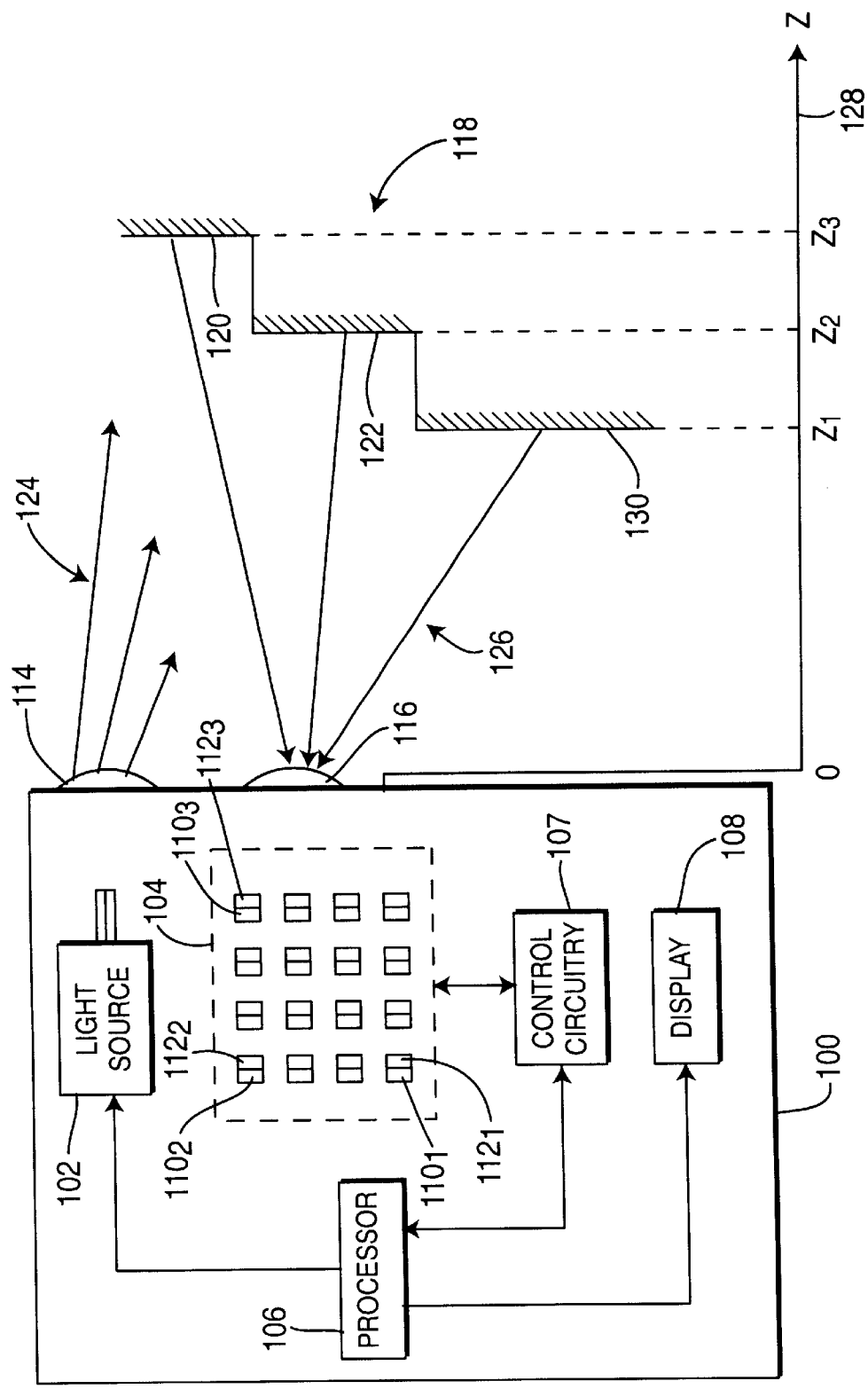
FIG. 1 depicts a block diagram showing an exemplary three-dimensional imager incorporating an array of drift-field detectors of the present invention.

FIG. 1 depicts a block diagram showing an exemplary three-dimensional imaging system 100 incorporating the apparatus of the present invention. The system 100 comprises a light source 102, a drift-field detector array 104, a processor 106, control circuitry 107, and a display 108. The light source 102 produces light pulses 124 to illuminate a target 118. The light pulses 124 reflect from the target 118 and are focused onto the drift-field detector array 104 by an optical lens 116. The detected light signals are processed by processor 106, under control of control circuitry 107, for display as an image on display 108.

More specifically, the light source 102 comprises a light emitting diode (LED) or laser source capable of emitting a pulse of light 124 of a particular wavelength. The wavelength of the light pulse 124 depends upon the particular application of the imager 100, and is generally in the range between ultraviolet and infrared wavelengths. As shown, the light pulse 124 passes through optical lens 114 before traveling to a target 118. Alternatively, the light source 102 can transmit the light pulse 124 to the target 118 without the aid of the optical lens 114 if the light source 102 is sufficiently powerful.

Axis 128 represents the distance between the target 118 and the system 100, with the origin at the system 100. The target 118 comprises a first portion 130 that is a distance $Z_1$ from the system 100, a second portion 122 that is a distance $Z_2$ from the system 100, and a third portion 120 that is a distance $Z_3$ from the system 100. The light pulse 124 illuminates the target 118, causing at least some of the light to be reflected back toward the system 100 in the form of reflected light 126. The reflected light comprises a multiplicity of scattered light pulses. The reflected light 126 passes through optical lens 116, which focuses the reflected light 126 onto the drift-field detector array 104. The drift-field detector array 104 comprises a plurality of drift-field detectors $110_1$ through $110_N$ (collectively 110) and respective analog storage devices $112_1$ through $112_N$ (collectively 112). A 4×4 array of drift-field detectors 110 is shown for simplicity, but the present invention can have an M×N array of drift-field detectors 110, where M and N are integers having a value of 1 or more. The optical lens 116 operates such that a reflected light pulse from a point on the surface of the target 118 will only fall upon the $i^{th}$ drift-field detector $110_i$ in the array 104 that is focused upon such point. That is, each of the drift-field detectors 110 has a field of view (FOV) that dictates which light pulses in the reflected light 126 will be detected by a given drift-field detector $110_i$.

Figure 2:
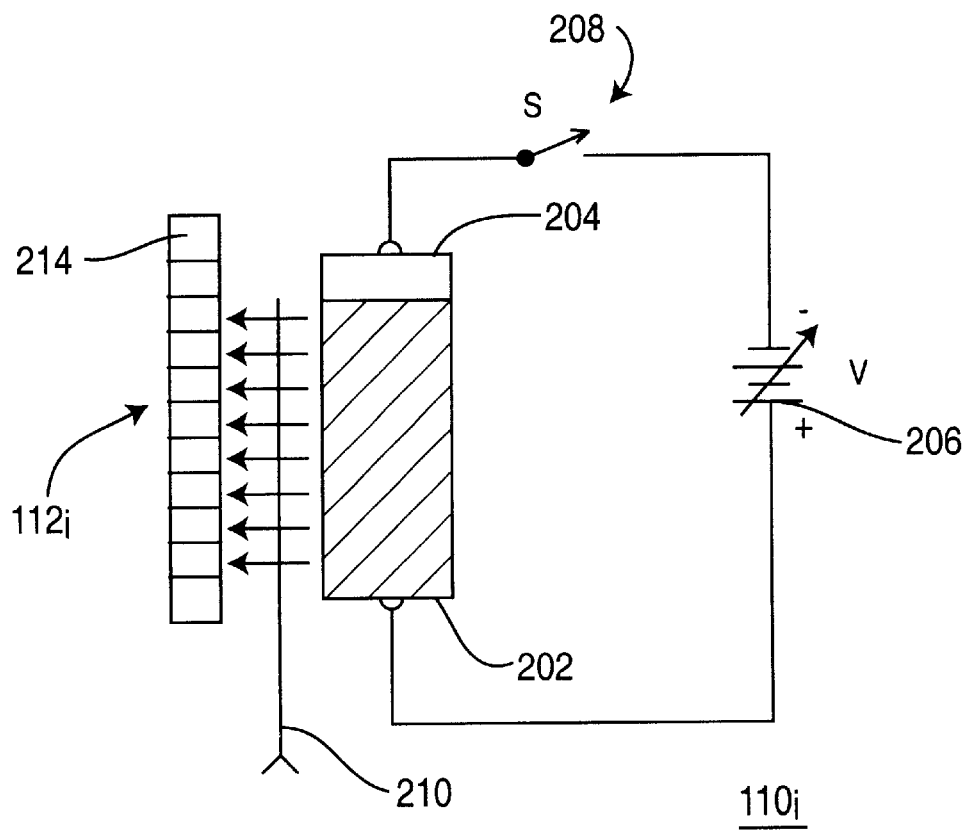
FIG. 2 depicts a schematic diagram showing a single drift-field detector.

FIG. 2 depicts a schematic diagram showing an individual drift-field detector $110_i$ in accordance with the present invention. The drift-field detector $110_i$ comprises a light sensor 204 and a semiconductor drift region 202. The light sensor 204 comprises a light sensitive detector, such as a silicon photodetector (e.g., a PIN photogate detector). The choice of light sensitive detector for the light sensor 204 is dictated by the wavelength of operation. For example, if the light source 102 of the system 100 transmits an illuminating pulse in the ultraviolet or visible spectrum, then the light sensor 204 can comprise a silicon photodetector. If the light source 102 of the system 100 transmits an illuminating pulse in the short-wave infrared light (SWIR) spectrum, the light sensor 204 can comprise a platinum silicide detector, or a III–IV detector and appropriate readout circuitry (e.g., control circuitry 107). In this manner, the present invention can provide for an "eye-safe" imaging system. In any case, all that is required is for the light sensor 204 to generate a charge proportional to the amount of incoming photon energy incident upon it, and that this charge be injected into the drift region 202 in the form of electrons or holes, as described below.

In one embodiment, the drift region 202 comprises an N-buried channel formed in silicon having a known length. Alternatively, the drift region 202 can be formed of P-type silicon, wherein holes are injected into the drift region 202 from the light sensor 204. In either case, the drift region 202 is electrically coupled to the light sensor 204 such that charge (be it electrons or holes) is injected into the drift region 202 from the light sensor 204 when light is detected. In one embodiment, the light sensor 204 and the drift region 202 are formed monolithically on a silicon substrate. This allows for production of the drift-field detector $110_i$ in standard silicon foundries using standard design rules for cost-effective fabrication. In addition, the appropriate detector readout circuitry (e.g., control circuitry 107) can be incorporated into the same silicon substrate as the drift region. Alternatively, the light sensor 204 can be fabricated apart from the drift region 202 and then be bump bonded thereto.

A variable voltage source 206 is coupled on one end to the light sensor 204, and on the other end to the drift region 202. The variable voltage source 206 generates an electric field in the drift region 202. The voltage of voltage source 206 is controlled by processor 106 through control circuitry 107. In the embodiment shown, the variable voltage source 206 is coupled using ohmic connections. Alternatively, the variable voltage source 206 can be coupled to the light sensor 204 and drift region 202 via a plurality of gates (not shown) disposed thereon for generating the electric field. In any case, the variable voltage source 206 is controlled via switch 208. Switches 208 for the drift-field detectors 110 are controlled via control circuitry 107. In one embodiment, control circuitry 107 comprises a CMOS multiplexer capable of selectively controlling each switch 208 in the array 104, as well as the voltage applied by respective variable voltage source 206. In this manner, the processor 106 can control the electric field for specific ones of the drift-field detectors 110. In such an embodiment, the CMOS multiplexer can be formed monolithically with the light sensors 204 and/or the drift regions 202.

In addition, the drift region 202 is associated with an analog storage device $112_i$. The analog storage device $112_i$ can comprise a charge-coupled device (CCD) register having a plurality of bins 214 formed therein. In such an embodiment, the analog storage device $112_i$ can be formed monolithically with the light sensor 204 and/or the drift region 202. CCD transfer gate 210 acts as the interface between the drift region 202 and the analog storage device $112_i$ for the transfer of charge therebetween. Each CCD transfer gate 210 is controlled by control circuitry 107. In one embodiment, control circuitry 107 comprises a second CMOS multiplexer capable of selectively controlling each CCD transfer gate 210 in the array 104. In this manner, the processor 106 can control the charge transfer between specific ones of the drift-field detectors 110 and their respective analog storage device 112. Again, the second CMOS multiplexer can be formed monolithically with the other components of the array 104.

In operation, a light pulse strikes the surface of the light sensor 204 and photon energy is converted into electric charge. The charge integration time for the light sensor 204 can be gated using control gates and a charge dump drain (not shown). The electric charge is injected into the drift region 202. The variable voltage source 206 supplies a voltage differential across the drift region 202 such that an electric field is produced therein. This electric field is enabled and disabled by switch 208. When the electric field is applied, the charge injected into the drift region 202 moves through the semiconductor material at a rate determined by the electric field combined with thermal diffusion. This rate also depends upon other factors, such as the type and temperature of the semiconductor material. Thus, a charge distribution will form in the drift region 202 having a certain shape and position. When the electric field is removed (by opening switch 208), the charge distribution will remain fixed within the drift region 202, but the shape will continue to disperse due to thermal diffusion. The velocity of electrons due to thermal diffusion, however, can be adjusted to be much less than the velocity of electrons where the electric field is applied to the drift region 202.

In order to retain the position and shape of the charge distribution in the drift region 202, the charge distribution is transferred to the analog storage device $112_i$. The position of the charge distribution in the drift region 202 essentially "freezes" for a time long enough to move the charge from the drift region 202 to the analog storage device $112_i$. In the present embodiment, the analog storage device $112_i$ is a CCD register having a plurality of bins 214 capable of storing charge. Specifically, once the electric field is removed from the drift region, CCD transfer gate 210 operates to transfer the charge distribution from the drift region 202 to the plurality of bins 214. The number of bins 214 depends on the desired resolution of the charge distribution. That is, more bins 214 in the CCD register results in the storing of more detail of the shape and position of the charge distribution in the drift region 202. In one embodiment, the transfer time from the drift region 202 to the bins 214 is in the range of 5 to 20 ns at room temperature to keep the thermally induced dispersion in the drift region within desirable limits. The operation of the analog storage devices 112 is described in more detail below with respect to FIG. 3.

Returning to FIG. 1, since portion 120 of the target 118 is farther away from the system 100 than portion 122, light reflected from portion 120 will take longer to reach the system 100 than light reflected from portion 122. Thus, different light pulses in the reflected light 126 will arrive at the system 100 at different times. The difference between times-of-arrival of light pulses can be used to determine the depth of the scene. The present invention can resolve the relative times-of-arrival of light pulses incident on an array of drift field detectors 104 using the charge distribution in each of the drift field detectors 110.

Specifically, each of the drift-field detectors 110 is activated (i.e., the switch 208 is closed and the electric field applied in each drift region 202 via control circuitry 107) at some time $t_{start}$ after the illuminating pulse 124 has been transmitted. This time can coincide with the arrival of the first light pulse reflected from the target 118, but this does not necessarily have to be the case. The time $t_{start}$ can coincide with the arrival of the first light pulse of interest that is reflected from the target 118. As described more fully below, the time difference between when the illuminating pulse 124 is transmitted and when the drift-field detectors 110 are activated controls the range of the system 100.

Assume that one particular drift-field detector $110_1$ within the array 104 is focused upon portion 130 of target 118. The associated drift-field detector $110_1$ will detect the reflected light pulse and generate a charge packet in response to the incoming photon energy. This charge is injected into the associated drift region 202 and begins to drift in response to the electric field. At some later time, a reflected light pulse will arrive at optical lens 116 from portion 122 of target 118 and will be detected by another drift-field detector $110_2$. Again, the charge will be injected into the drift region 202 of this second drift-field detector $110_2$ and will begin to drift. Hitherto the charge in the drift region 202 of the first drift-field detector $110_1$ has continued to drift. In a similar fashion, another drift-field detector $110_3$ will detect a reflected light pulse from portion 120 of target 118 at yet a later time. This charge is injected into the drift region 202 of this third drift-field detector $110_3$ and will begin to drift. Again, hitherto the charge in both drift regions 202 of the first and second drift-field detectors $110_1$ and $110_2$ has continued to drift. Finally, at some time $t_{stop}$ the electric fields in the drift regions 202 of the drift-field detector array 104 will be turned off, and all drifting of charge will cease (with the exception of thermal diffusion, as described above).

As described above, the charge distributions in the drift-field detectors 110 are transferred to analog storage devices 112 at some time after $t_{stop}$. The processor 106 can then read the charge from the analog storage devices 112 via control circuitry 107. Once read out, the processor 106 uses the relative positions of the charge distributions in the drift regions 202 to calculate the relative times-of-arrival of the light pulses. Given the relative times-of-arrival of the light pulses, the processor 106 can compute a three-dimensional image that can be shown on display 108.

Figure 4A:
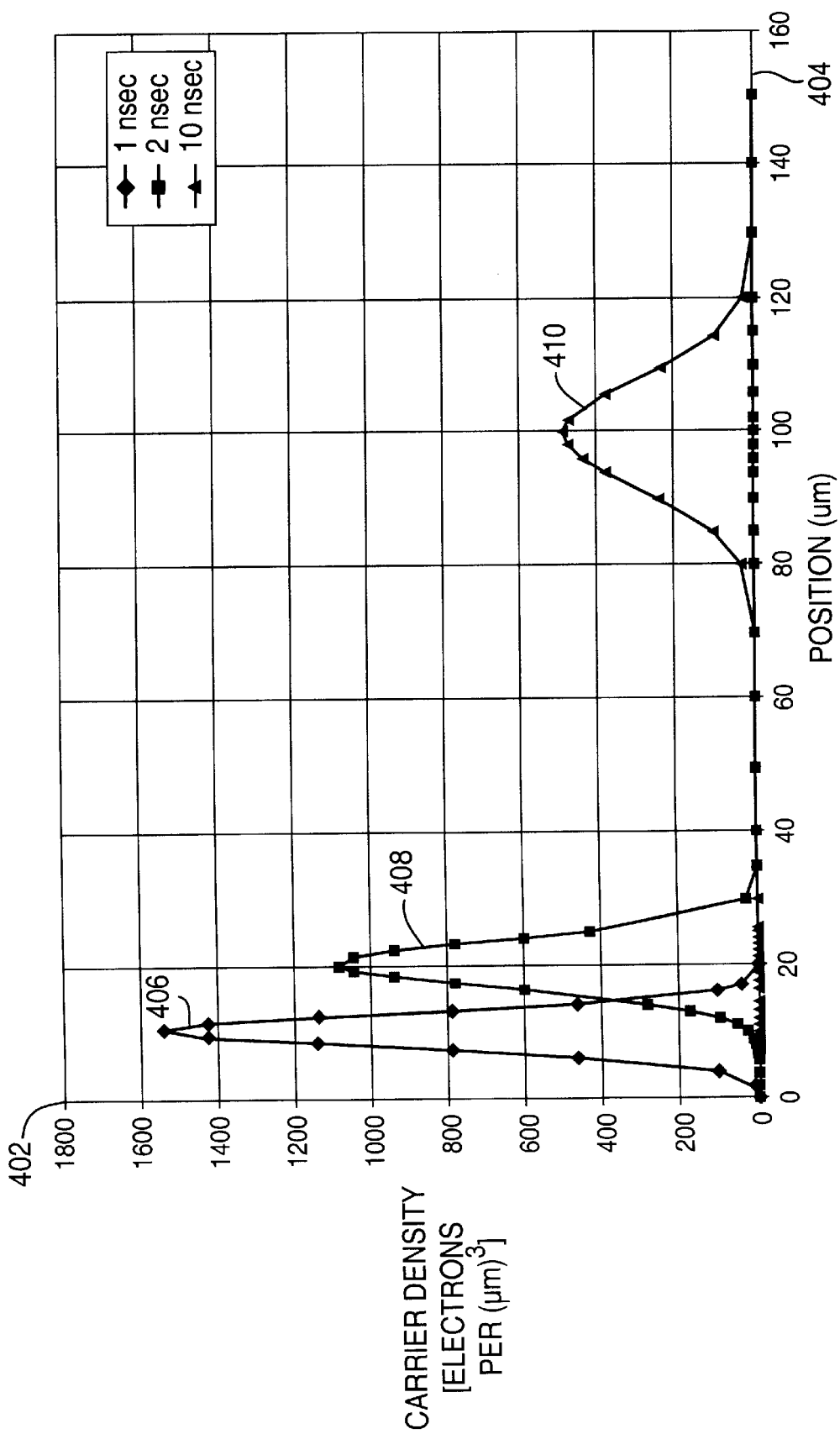
FIGS. 4A through 4C are graphs showing charge distributions in drift regions of three drift-field detectors of the present invention.
Figure 4B:
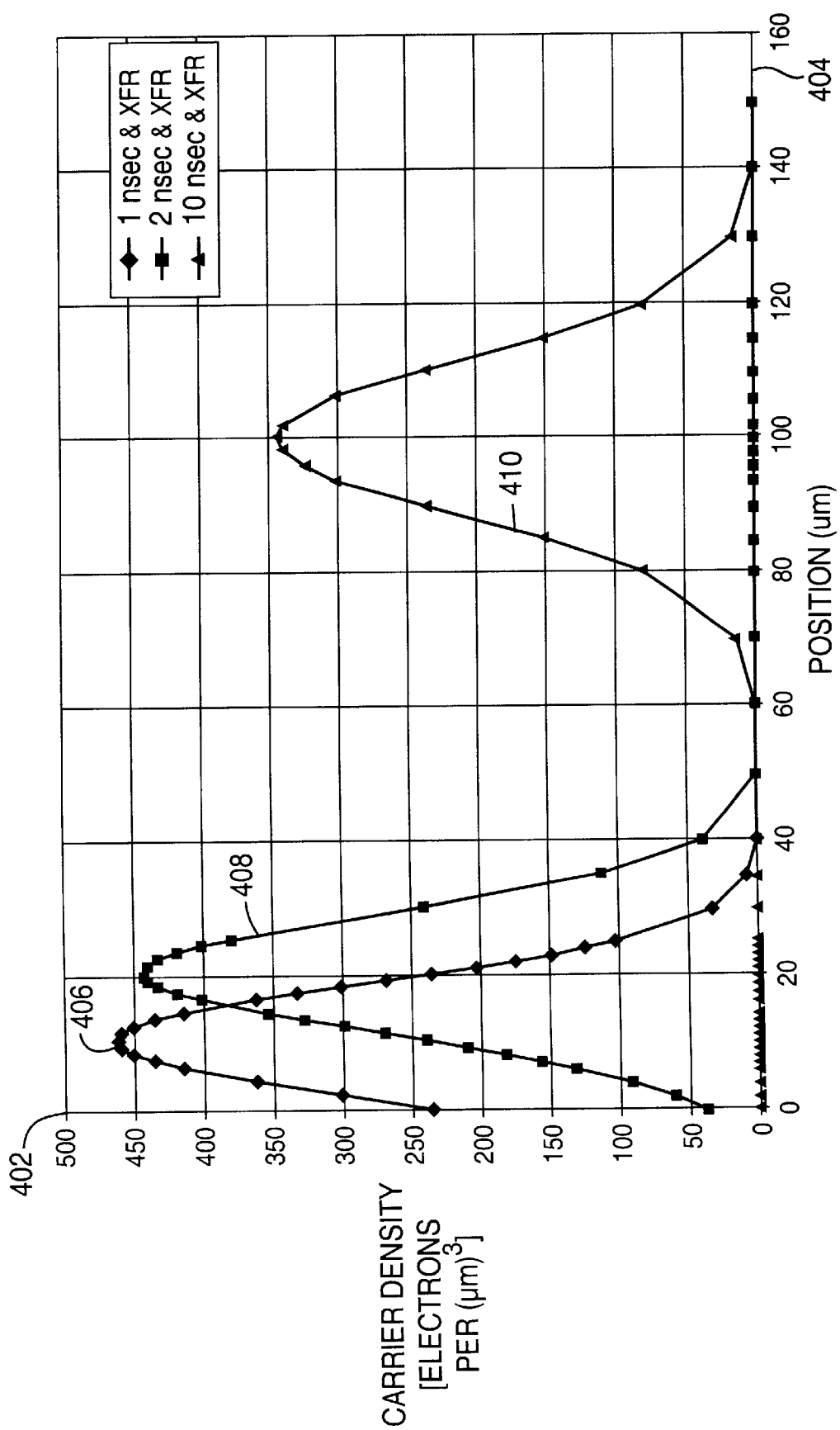
Figure 4C:
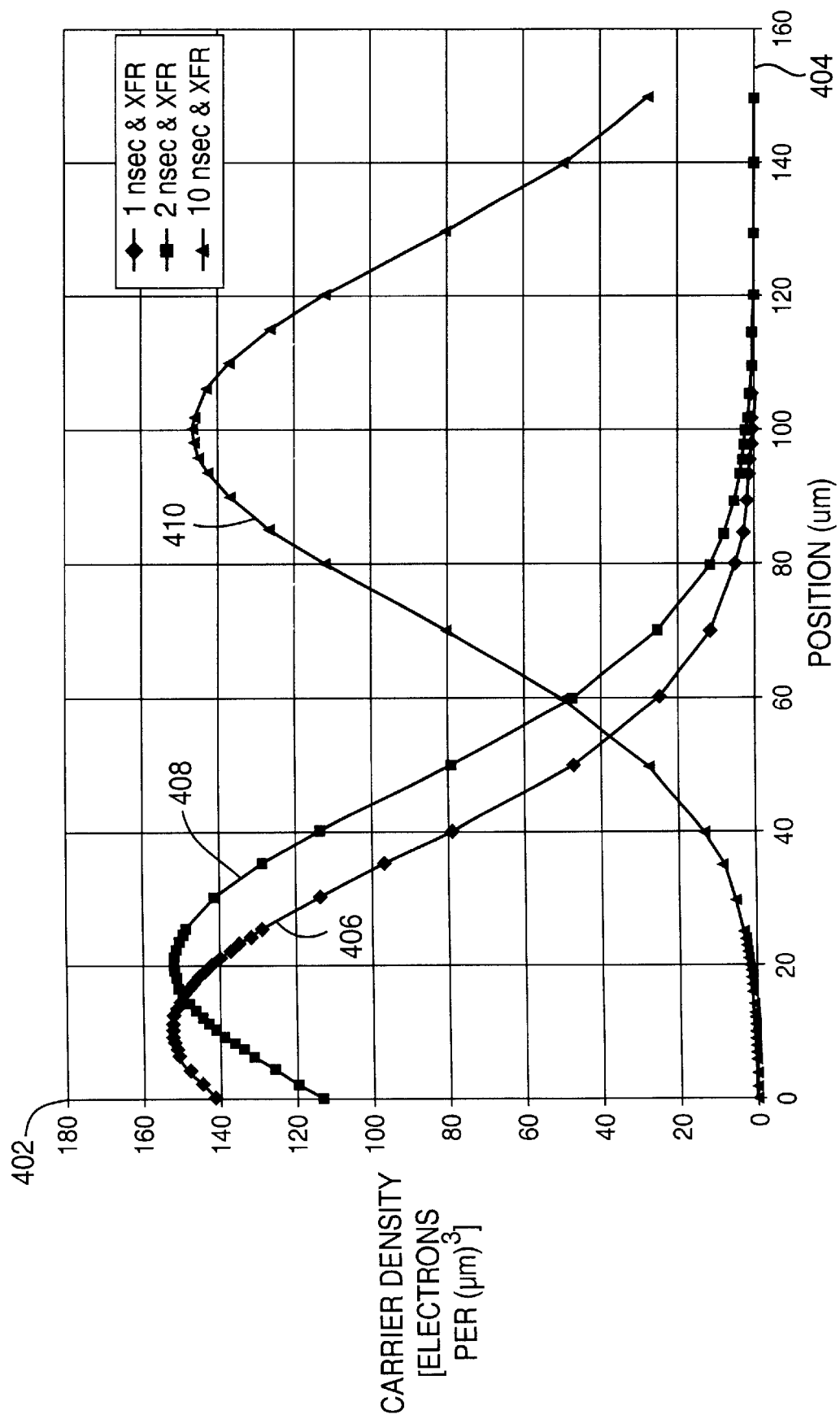

FIGS. 4A through 4C are graphs showing charge distributions in drift regions of the three drift-field detectors $110_1$, $110_2$, and $110_3$. FIGS. 4A through 4C share common axes. Axis 402 represents the carrier density in the drift region 202 having units of electrons per $\mu m^2$. Axis 404 represents position in the drift region 202 having units of $\mu m$. Assume each drift region has a length of approximately 100 $\mu m$ and an electric field of approximately 10 V/100 $\mu m$. Assume also that time $t_{start}$ is time t=0, and time $t_{stop}$ is time t=10 ns. Finally, assume that the first light pulse arrives at time t=0, the second light pulse arrives at time t=8 ns, and the third light pulse arrives at time t=9 ns.

FIG. 4A shows the charge distributions right after the electric fields are removed from the three drift regions at time t=10 ns. Curve 410 represents the charge distribution in the drift region 202 of the first drift-field detector $110_1$, curve 408 represents the charge distribution in the drift region 202 of the second drift-field detector $110_2$, and curve 406 represents the charge distribution in the drift region 202 of the third drift-field detector $110_3$. After 10 ns of the applied electric field, the centroid of the charge distribution 410 has drifted to a position of 100 $\mu m$. After 2 ns of the applied electric field, the centroid of the charge distribution 408 has drifted to a position of 20 $\mu m$. Finally, after 1 ns of the applied electric field, the centroid of the charge distribution 406 has drifted to a position of 10 $\mu m$. The shape of each charge distribution spreads due to thermal diffusion as it drifts due to the electric field. The effects of thermal diffusion are most apparent in the drift region of the first drift-field detector $110_1$, where the charge has been drifting for 10 ns (i.e., curve 410).

As can be seen from FIG. 4A, sub-nanosecond differences between times-of-arrival of light pulses can be easily discerned using centroid detection. Using known diffusion characteristics, it is possible to find the centriod of a charge distribution with high accuracy (e.g., better than a tenth of a nanosecond). Given the start time of the electric field, the position of the centriod of the charge distribution, and the rate of drift in the semiconductor material, the time-of-arrival of the light pulse that gave rise to the injected charge can be determined. Thus, each drift-field detector $110_i$ in the array 104 can collect information to determine the relative time-of-arrival of a light pulse striking its light sensor 204.

FIGS. 4B and 4C show the effects of thermal diffusion on the charge distributions in drift-field detectors $110_1$, $110_2$, and $110_3$. FIG. 4B shows the-charge distributions 10 ns after the electric field has been removed. As the charge thermally diffuses, the peak amplitude of the distribution decreases. The centroid, however, remains in a fixed position. FIG. 4C shows the normalized charge distributions 100 ns after the electric field has been removed. As illustrated, the charge distributions almost completely overlap, and thus make it difficult to distinguish among their positions to determine the times-of-arrival. In one embodiment, the charge distribution in each drift region 202 is transferred into its respective analog storage device $112_i$ within 5 to 20 ns after the electric field is removed.

The length of the drift region 202 and the magnitude of the electric field dictate the time $t_{stop}$. In the above example, the drift region 202 of each the drift-field detectors 110 was 100 μm and the electric field was 10 V/100 μm. In that example, each of the drift-field detectors 110 could only be activated for 10 ns after the first signal of interest arrived. If they were activated for any longer, charge would begin to drift out of the drift region 202, and time-of-arrival data for the first incoming reflected light pulses would be lost. In that example, the drift-field detector array 104 can resolve centimeters of resolution with a total range of about 30 meters. Thus, the length of the drift field 202 and the magnitude of the electric field dictate the maximum depth range of the system 100. The time $t_{start}$ controls where the range begins. That is, the range is a window that can be moved forward and away from the system 100 by controlling when the drift-field detectors 110 are activated relative to the emission of light pulses 124. The resolution and depth range can be zoomed by varying the magnitude of the electric field (by varying the voltage of variable voltage supply 206). For example, the electric field can be set such that the drift-field detector array 104 can resolve millimeters of resolution with a total range of about 3 meters. Additionally, particular groups of drift-field detectors 110 can have a higher or lower magnitude electric field than other groups by employing selective control via control circuitry 107. In one embodiment, selective control is implemented via CMOS multiplexers as described above. In such an embodiment, the drift-field detector array 104 would allow the system 100 to zoom in on particular portions of the target 118.

Figure 5:
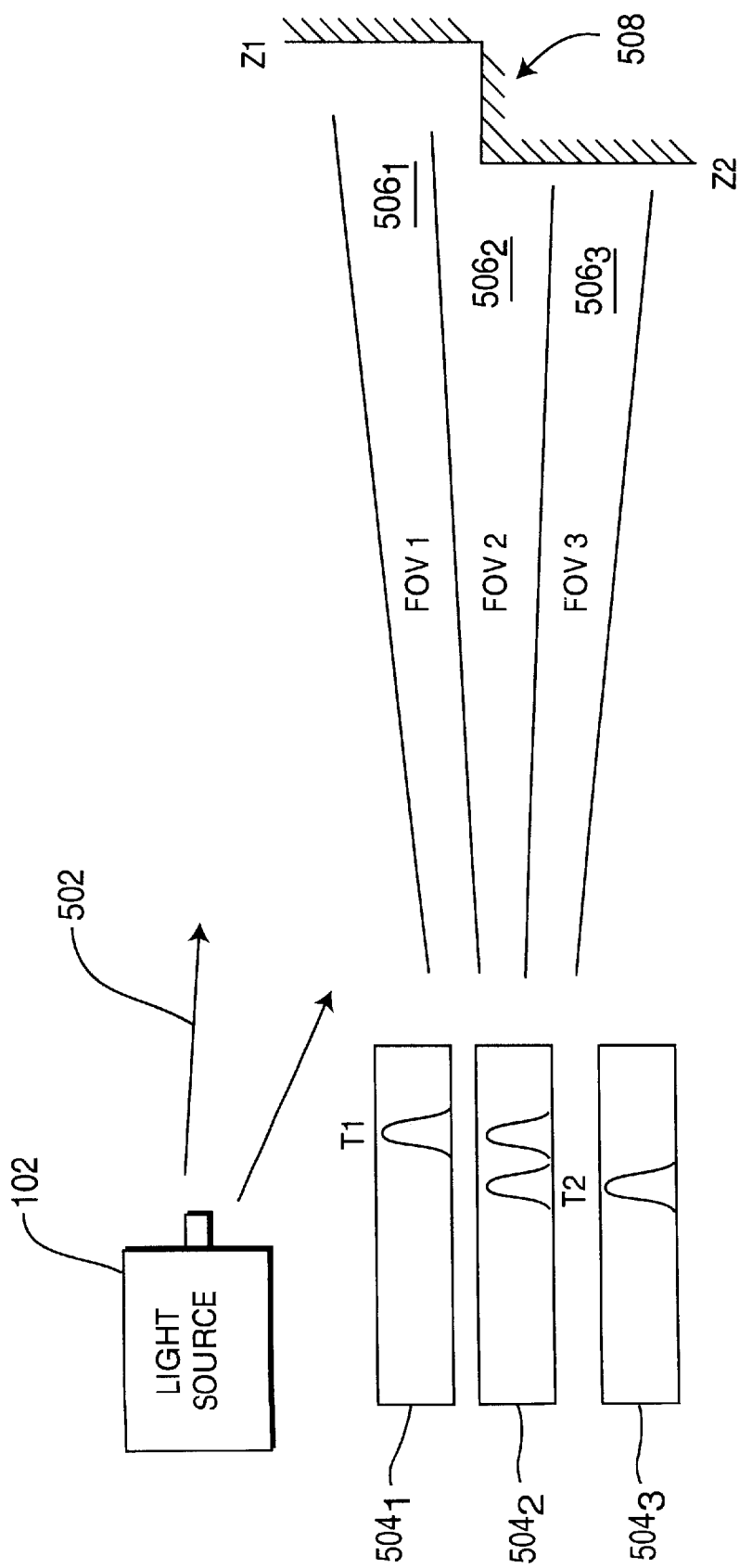
FIG. 5 illustrates multiple light pulses having different times-of-arrival striking a signal drift-field detector of the present invention.

The above discussion assumed that three light pulses differing in times-of-arrival struck three different drift-field detectors $110_1$, $110_2$, and $110_3$. FIG. 5 illustrates a case where multiple light pulses that differ in times-of-arrival strike a single drift-field detector. As shown, light source 102 transmits an illuminating pulse 502 towards the target 508. Drift fields $504_1$, $504_2$, and $504_3$ for three drift-field detectors are shown, having fields of view $506_1$, $506_2$, and $506_3$, respectively. The field of view $506_2$ for the second drift field $504_2$ covers portions of the target 508 having two different depths $Z_1$ and $Z_2$. Thus, drift field $504_2$ will contain two discernible charge distributions. This result is inherent in the design of the present invention. Thus, the present invention can advantageously discern multiple distances within a single drift-field detector using a signal illuminating pulse. Resolving multiple distances within a single drift-field detector significantly enhances the processing of three-dimensional data.

Figure 3:
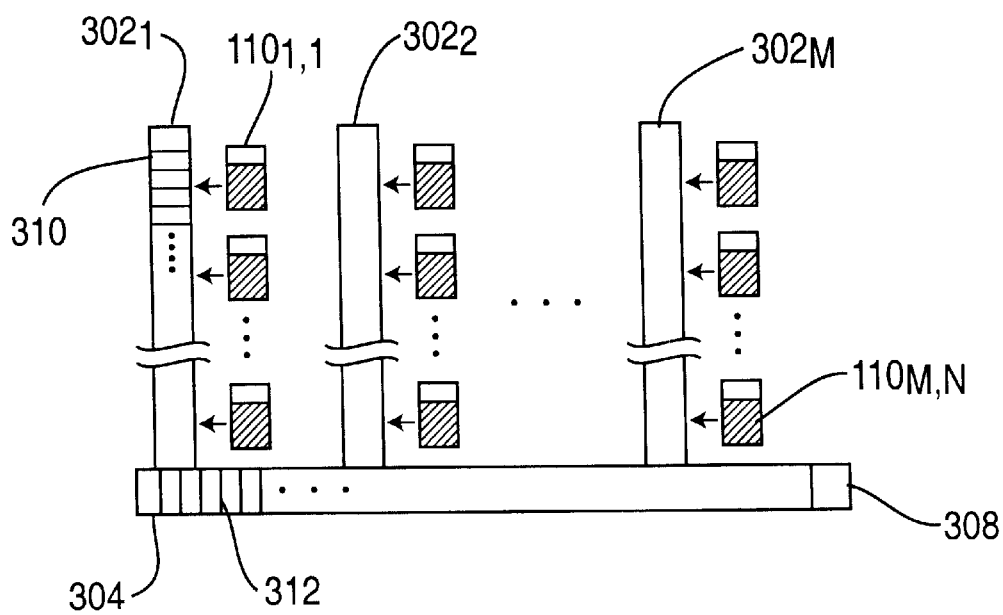
FIG. 3 depicts a block diagram showing one embodiment of analog storage devices for use with the present invention.

FIG. 3 depicts a block diagram showing one embodiment of analog storage devices 112. The analog storage devices 112 comprise M vertical CCD registers $302_1$, through $302_M$ (collectively 302), a horizontal CCD register 304, and an electrometer 308. Each of the vertical CCD registers 302 comprises a multiplicity of bins 310 for storing charge. The horizontal CCD register 304 also comprises a multiplicity of bins 312. An M×N array of drift-field detectors 110 is shown. Each column of drift-field detectors 110 is associated with one of the vertical CCD registers 302. Each of the vertical CCD registers 302 is further coupled to the horizontal CCD register 304. Operation is in accordance with what is known in the art as interline transfer. The charge distribution in each drift region is first transferred to bins 310 substantially as described above with respect to FIG. 2. Then, for each of the vertical CCD registers 302, the charge in a first set of bins 310 associated with the first drift-field detector 110 in the column is transferred to bins 312 in the horizontal CCD register 304. The horizontal CCD register 304 comprises at least enough bins 312 to hold charge data from a detector in each of the vertical CCD registers 302. All the charge in each of the vertical CCD registers 302 is then moved down in charge-transfer fashion to fill the empty bins.

Once this first set of charge is in the horizontal CCD register 304, this charge is transferred using standard CCD practice to be detected by electrometer 308. The electrometer 308 can comprise a floating diffusion electrometer stage known in the art. The electrometer 308 converts charge to voltage, which then can be read out by the processor 106 through control circuitry 107 of FIG. 1. The processor 106 then displays the information on display 108. This process repeats until all of the charge is read out from the analog storage devices 112.

The embodiment shown in FIG. 3 for the analog storage devices 112 allows the present invention to bin multiple fields from the drift regions. Specifically, a first illuminating pulse illuminates the target as described above with respect to FIG. 1. The drift-field detectors 110 detect the reflected light pulses, and the analog storage devices 112 store the charge distributions. At this point, however, the vertical CCD registers 302 are not read into the horizontal CCD register 304. A second illuminating pulse illuminates the target and the process is repeated. After each reflected pulse, the charge in each drift region drifts to give time resolution, the field is removed, and the charge pattern is loaded into the vertical CCD register 304. The summing of charge, or "charge binning", in the analog storage devices 112 is substantially noiseless. In this embodiment, the time separation of the illuminating pulses must be greater than the maximum drift time plus the transfer time from the drift regions to the analog storage devices 112. Charge binning allows the present invention to detect reflected light pulses that are very weak thereby increasing system sensitivity.

The use of CCD registers for the analog storage devices 112 also provides very low readout noise capability. The CCD registers can be cooled using thermo-electric coolers (not shown) so that the binning of charge and readout can be carried over tenths of seconds. It is important to note that the slower the charge is read out from the analog storage locations 112, the less noise is introduced into the system. The present invention advantageously allows for very slow readouts when imaging in noisy environments.

In yet another embodiment, the signal-to-noise ratio of the X and Y resolution information provided by array 104 can be further improved by charge binning the charge distribution after the depth information has been obtained. Specifically, the invention operates as described above to obtain a three-dimensional image. That is, the charge distribution from each of the drift-field detectors 110 is stored in the analog storage devices 112. Charge binning can be used to increase system sensitivity. Then, a non-destructive readout of the charge distributions is performed to obtain the information necessary to display the depth of the scene. Then, the charge distribution for each of the drift-field detectors 110, spread over multiple bins in the vertical CCD registers 302, can be binned into a single CCD stage (e.g., a single CCD stage in horizontal CCD register 304) representing a pixel associated with the X and Y position of that particular drift-field detector 110. This second stage of charge binning increases the signal-to-noise ratio for a second readout of the two-dimensional information. That is, the charge distributions are summed so as to represent a pixel of the scene without depth information. In another embodiment, only a subset of the drift-field detectors have their charge binned into a single CCD stage. In this embodiment, some of the three-dimensional information is saved for further processing. Again, this selective control can be implemented using control circuitry 107 comprising a CMOS multiplexer as described above.

While the foregoing is directed to the preferred embodiment of the present invention, other and further embodiments of the invention may be devised without departing from the basic scope thereof, and the scope thereof is determined by the claims that follow.

What is claimed is:

1. An apparatus for resolving relative times-of-arrival of light pulses comprising:
   a plurality of light sensors, each light sensor generating an electric charge from at least one of the light pulses;
   a plurality of drift regions respectively associated with the plurality of light sensors, each drift region receiving electric charge and producing a spatial charge distribution therein in response to an electric field; and
   a control circuit for resolving relative times-of-arrival of light pulses in response to position of at least one spatial charge distribution within a respective at least one of the plurality of drift regions.

2. The apparatus of claim 1 further comprising:
   a plurality of analog storage devices respectively associated with the plurality of drift regions, each analog storage device capable of storing the spatial charge distribution of its respective drift region.

3. The apparatus of claim 2 wherein each analog storage device comprises a charge-coupled device (CCD) register having a plurality of bins.

4. The apparatus of claim 3 further comprising:
   a CCD transfer gate for transferring charge from each of the drift regions to their respective analog storage device.

5. The apparatus of claim 4 further comprising:
   first CMOS multiplexer for selectively transferring the spatial charge distribution from specific ones of the drift regions via their respective CCD transfer gate to their respective analog storage region.

6. The apparatus of claim 1 wherein each drift region comprises an N-buried channel formed in silicon.

7. The apparatus of claim 1 wherein each drift region comprises a P-buried channel formed in silicon.

8. The apparatus of claim 3 further comprising:
   a horizontal CCD register for reading out each CCD register using interline transfer.

9. The apparatus of claim 1 wherein the plurality of light sensors and each drift region are formed on the same substrate.

10. The apparatus of claim 1 wherein the plurality of light sensors are disposed in a two-dimensional array.

11. The apparatus of claim 1 further comprising a second CMOS multiplexer for selectively applying the electric field to each drift region.

12. The apparatus of claim 1 wherein each of the plurality of light sensors comprises a light detector selected from the group consisting of a silicon photodetector, a platinum silicide detector, and a III–V detector.

13. A method of resolving relative times-of-arrival of light pulses comprising:
   producing an electric charge for a plurality of the light pulses;
   injecting the electric charge into a drift region;
   applying an electric field to the drift region to produce a spatial charge distribution therein; and
   resolving relative times-of-arrival of the plurality of the light pulses in response to a position of the spatial charge distribution within the drift region.

14. The method of claim 13 further comprising storing the spatial charge distribution in an analog storage device.

15. The method of claim 13 further comprising storing the spatial charge distribution in a charge-coupled device (CCD) register comprising a plurality of bins.

16. The method of claim 15 further comprising reading out the spatial charge distribution using interline transfer.

17. The method of claim 15 further comprising:
   reading out the spatial charge distribution using a non-destructive read out; and
   summing the spatial charge distribution to form a single charge value associated with an X and Y position of the drift region.

18. The method of claim 13, further comprising:
   injecting the electric charge into additional drift regions;
   applying the electric field to the additional drift regions to produce additional spatial charge distributions; and
   resolving relative times-of-arrival of the plurality of light pulses in response to position of at least one of the additional spatial charge distributions within a respective at least one of the additional drift regions.

19. A three-dimensional imaging apparatus comprising:
   a light source for illuminating a target;
   a light sensor for generating an electric charge from a plurality of light pulses reflected from the target;
   a drift region for receiving the electric charge and producing a spatial charge distribution therein in response to an electric field;
   an analog storage device for storing the spatial charge distribution; and
   a processor for computing a three-dimensional image in response to a position of the spatial charge distribution within the drift region.

20. The apparatus of claim 19 wherein the analog storage device comprises a charge-coupled device (CCD) register having a plurality of bins.

21. The apparatus of claim 19, further comprising:
   additional light sensors for generating electric charges from the plurality of light pulses reflected from the target;
   additional drift regions respectively associated with the additional light sensors, for receiving the electric charges and producing spatial charge distributions in response to the electric field; and
   additional analog storage devices for storing the additional spatial charge distributions;
   wherein the processor is further configured to compute the three-dimensional image in response to position of at least one of the additional spatial charge distributions within the respective additional drift regions.

22. An apparatus for resolving relative times-of-arrival of light pulses comprising:
   a light sensor for generating an electric charge from a plurality of the light pulses;
   a drift region for receiving the electric charge and producing a spatial charge distribution therein in response to an electric field; and
   a control circuit for resolving relative times-of-arrival of the plurality of light pulses in response to a position of the spatial charge distribution within the drift region.

23. The apparatus of claim 22, further comprising:
   an analog storage device for storing the spatial charge distribution.

24. The apparatus of claim 23, wherein the analog storage device comprises a charge-coupled device (CCD) register having a plurality of bins.

* * * * *